United States Patent [19]
O'Barr et al.

[11] Patent Number: 5,631,952
[45] Date of Patent: May 20, 1997

[54] APPARATUS AND METHOD FOR MODEM WAKE-UP WITH AUTOBAUD FUNCTION

[75] Inventors: R. Mark O'Barr, Harvest; Lisa R. East, Owens Cross Roads; Mark Butler, Brownsboro, all of Ala.

[73] Assignee: Motorola, Inc., Schaumburg, Ill.

[21] Appl. No.: 324,956

[22] Filed: Oct. 18, 1994

[51] Int. Cl.$^6$ ............................................. H04M 11/00
[52] U.S. Cl. ............................ 379/93; 379/98; 375/222
[58] Field of Search ............................ 379/93, 94, 96, 379/97, 98; 375/222, 257, 369; 455/38.2, 38.3, 126, 127, 343

[56] References Cited

U.S. PATENT DOCUMENTS

| | | | |
|---|---|---|---|
| 4,656,318 | 4/1987 | Noyes | 379/93 |
| 4,839,639 | 6/1989 | Sato et al. | 455/343 |
| 4,903,335 | 2/1990 | Shimizu | 455/343 |
| 4,951,309 | 8/1990 | Gross et al. | 379/98 |
| 4,996,706 | 2/1991 | Cho | 379/93 |
| 5,214,650 | 5/1993 | Renner et al. | 379/93 |
| 5,222,081 | 6/1993 | Lewis et al. | 375/369 |
| 5,343,515 | 8/1994 | Treffkorn | 379/98 |
| 5,375,051 | 12/1994 | Decker et al. | 379/98 |
| 5,428,671 | 6/1995 | Dykes et al. | 379/93 |

*Primary Examiner*—Stella Woo
*Attorney, Agent, or Firm*—Nancy R. Gamburd

[57] ABSTRACT

An apparatus and method for a data communications device, such as a modem, having a sleep mode for conserving energy and an operational mode for data transmission, to transition from the sleep mode to the operational mode. The wake up method and apparatus respond to the receipt of serial data from a terminal, including response to existing terminal commands. The wake up method and apparatus also autobauds to the serial data transmit signal. The wake up and autobauding operations occur in a way that are transparent to the user.

17 Claims, 2 Drawing Sheets

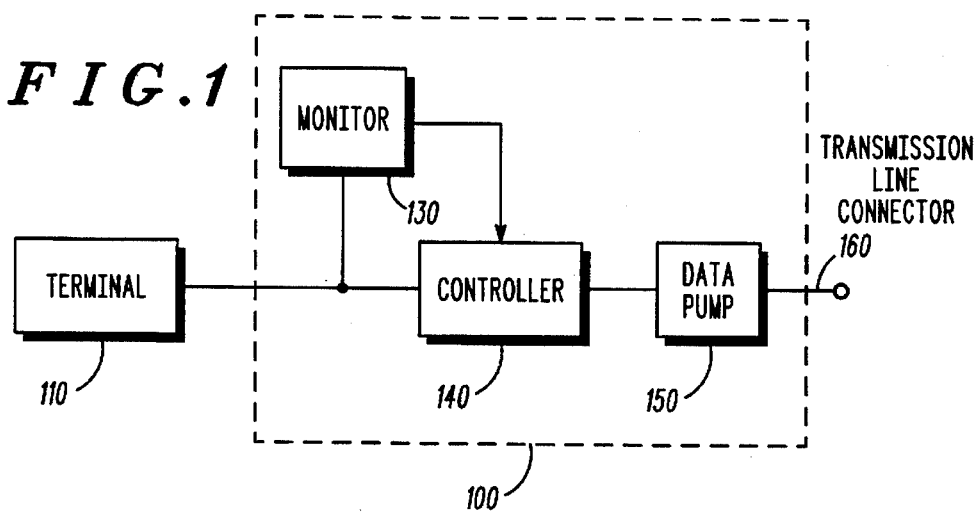
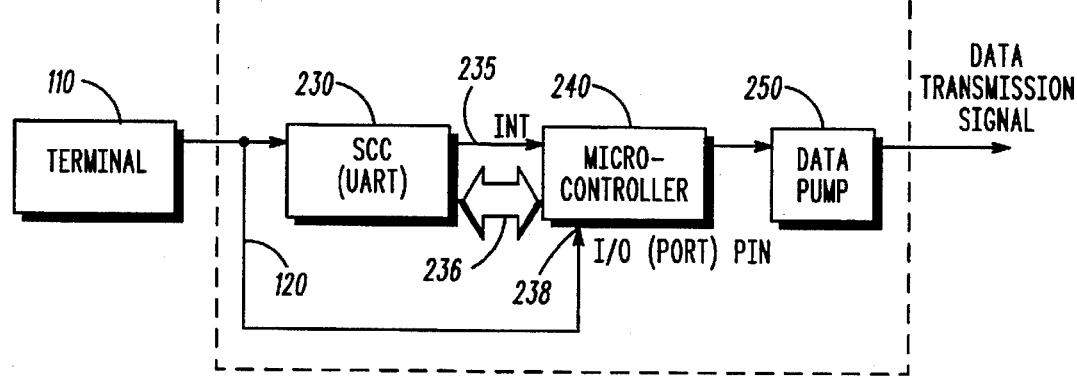
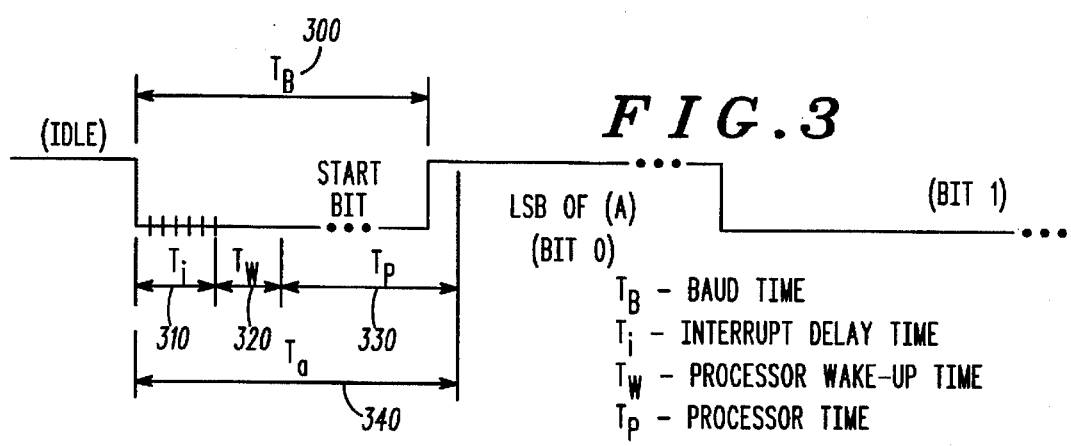

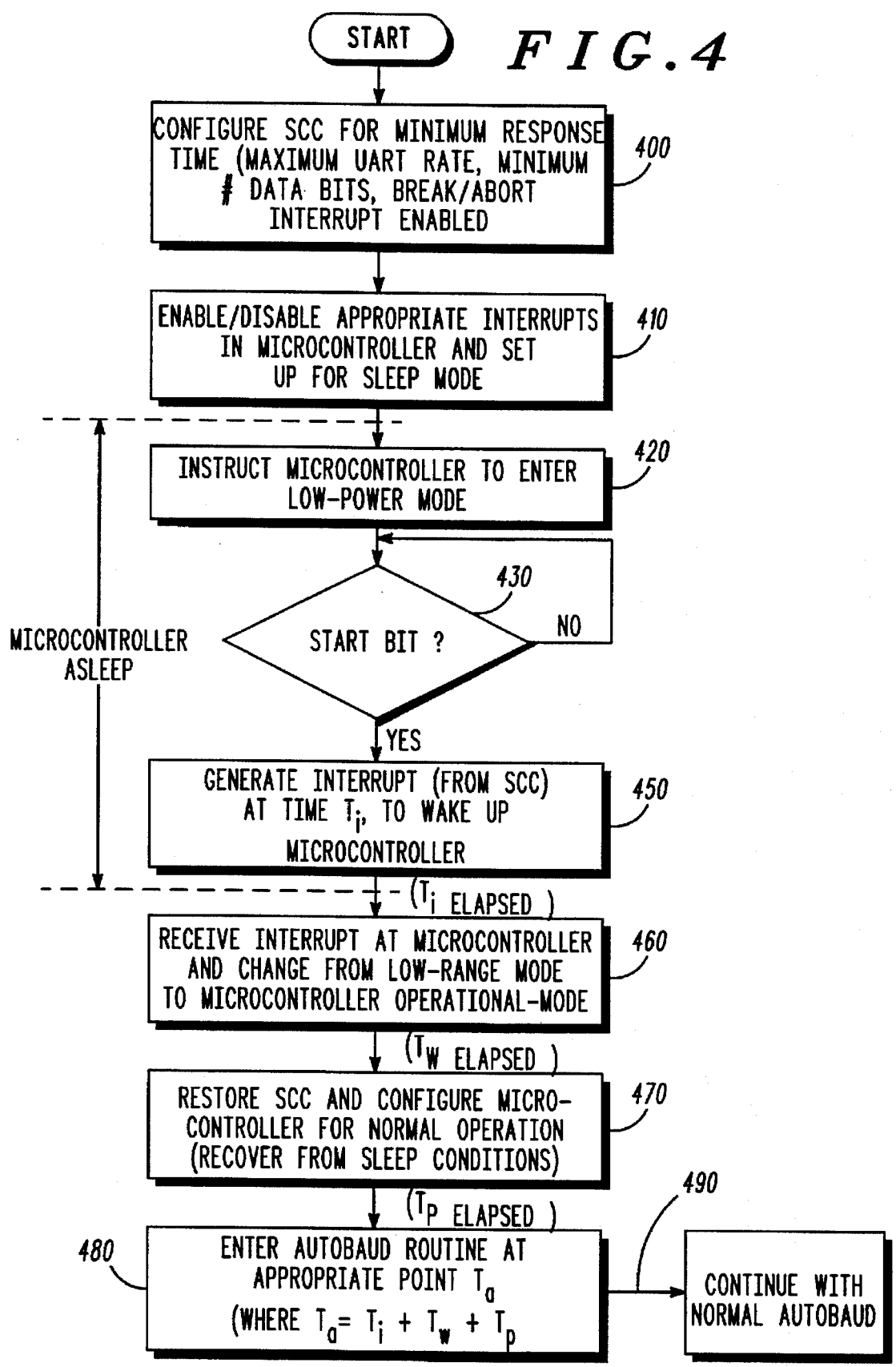

APPARATUS AND METHOD FOR MODEM WAKE-UP WITH AUTOBAUD FUNCTION

FIELD OF THE INVENTION

This application relates to data communication devices, including, but not limited to, modems that are in a low power (or sleep) mode and must reactivate or (wake up) to an operational mode for transmitting and receiving data.

BACKGROUND OF THE INVENTION

Data communication devices (DCDs) are used for data communications between terminals or personal computers over a public switched telephone network (PSTN), a cellular network, a private line or other communications network. Because DCDs are used with portable data terminals having battery power, DCDs may have a low power mode to conserve energy. DCDs in such a low power mode are also referred to as being in a sleep mode. A DCD in the sleep mode must be reactivated or otherwise placed in an operational mode to transmit and receive data. When the DCD is in the operational mode it may be performing a variety of data communication functions, such as configuring the DCD, training an equalizer, arranging data in a format for transmission, forming a data transmission signal, receiving a data transmission signal, and other functions. In order for the DCD to reactivate or transition from the sleep mode to the operational mode, a wake up apparatus or a wake up method is required.

Most DCDs are used in a home or an office environment where power is available from an electrical outlet. In recent years, however, the number of portable terminals, such as notebook computers having a battery for power, has greatly increased. Because the amount of energy that can be stored in a battery is limited and many DCDs receive battery power, these DCDs may have a sleep mode for energy conservation. DCDs may be put in a sleep mode manually or automatically, by removing some or all of the power from the DCD. Manually removing the power is inconvenient and may not work well if a user forgets to instruct the DCD to transition to the sleep mode. After the DCD is placed in a sleep mode, it is necessary to reactivate (wake up) the DCD to an operational mode in order to transfer data. Existing wake up methods either require a waiting period before commands and data can be sent from the terminal to the DCD, or are sufficiently slow that they are not transparent to the user except at very slow baud rates.

A signaling method disclosed in U.S. Pat. No. 4,951,309 describes a power down means that includes transmitting a power down signal from the terminal to the DCD. The power down signal must be removed from the DCD before it can return to the operational mode. The signaling method is not transparent to the user and requires modification of communications software and hardware.

Current wake up methods, moreover, are too slow for transparent autobauding at all of the various terminal baud rates used for terminal-to-DCD data transfer. In addition, the methods used to transition from the sleep mode to the operational mode may require modifications in software, hardware and other equipment, and nonetheless may still require additional, non-transparent operations by the terminal user. Because of these and other problems with the existing wake up methods for DCDs, better methods and devices are highly desirable.

BRIEF DESCRIPTION OF THE DRAWINGS

FIG. 1 is a block diagram showing an embodiment of the present invention.

FIG. 2 is a block diagram showing additional details and variations of an embodiment of the present invention.

FIG. 3 is a timing diagram of an embodiment of the present invention.

FIG. 4 is a flow diagram showing the method steps for an embodiment of the present invention.

DESCRIPTION OF THE PREFERRED EMBODIMENT

Referring to FIG. 1, there is shown a data communication device (DCD) 100 connected to a terminal 110, the connection to the terminal including a data line 120 for transferring serial data between the terminal and the DCD. The serial data is transferred at a terminal baud rate which may have values from 300 bits per second (BPS) to 57,600 BPS (or more). The terminal 110 may be a data terminal, a desktop personal computer, a portable computer or similar equipment. The DCD 100 has a monitor 130, a controller 140, a data pump 150 and a transmission line connector 160. Forming a transmission circuit, the transmission line connector 160 is coupled to a public switched telephone network (PSTN), a cellular network, a private network, or other available network. The data pump 150 includes a transmitter and receiver for two-way transmission of a data transmission signal on the transmission circuit. The monitor 130 monitors the serial data and generates an interrupt signal upon detecting a predetermined sequence. The operation of a wake up apparatus and method in accordance with the invention is described in further detail below.

FIG. 2 is a block diagram of an embodiment of this invention. A modem 200 interfaces to the terminal 110 via a serial port connection such as an RS232 interface, the interface having a data line 120 for coupling the serial data to the modem. The modem 200 includes a serial communications controller (SCC) 230, such as a Zilog 82530 or similar device, and a microcontroller 240, such as a Zilog Z80180. The SCC 230 may include a Universal Asynchronous Receiver and Transmitter (UART) for receiving the serial data. The microcontroller 240 is coupled to the SCC 230 for receiving parallel data via a data bus 236. The functions of the SCC 230 and the microcontroller 240 may also be combined and embodied in a single device, such as a Zilog Z80182. The modem 200 also includes a data pump 250, such as a Rockwell RC144DPL. The data pump 250 includes a modulator for generating a data transmission signal.

A sleep mode for the modem 200 is selected such that the SCC 230 remains operational while the microcontroller 240 is non-operational in a low power state. Because the SCC 230 is operational, it generates an interrupt signal upon detecting a start bit in the serial data, and transmits the interrupt signal to the microcontroller via line 235. The form of the interrupt signal may be any predetermined signal recognizable by the controller 240 and, for example, may be a logic 1 signal. The interrupt signal causes the microcontroller 240 to become operational. Because both the SCC 230 and the microcontroller 240 are then operational, the modem 200 is in an operational mode. In the preferred embodiment, the interrupt signal from the SCC 230 is transmitted to the same interrupt pin on the microcontroller that is used when the modem 200 is in a normal (i.e., non-sleep) operational mode and, accordingly, a separate or otherwise specially dedicated interrupt pin at the microcontroller 240 is not required. The specific pin connection depends upon the particular device package employed, and may include pin /INT0 on the Zilog Z80182, pin 1 for a QFP package, and pin 98 for a VQFP package. The operational microcontroller 240, in turn, generates a write (or host write) command to the data pump 250, which will then be reactivated and operate as required for data transmission.

After the modem 200 is in the operational mode, an autobaud routine is started for detecting the speed and format of the serial data. The autobaud routine is implemented in the microcontroller 240 and does not function when the microcontroller 240 is in the non-operational, low power state. For proper autobauding operation, an industry-accepted standard requires that all commands sent from the terminal 110 begin with the prefix "AT" or "at" (collectively referred to as "AT", and also commonly known as the AT command set). During typical modem operation, when the modem 200 is in the normal operational mode and may be transferring data, the autobaud routine monitors the serial data via an input-output (I/O) pin 238 and begins the autobaud process upon occurrence of the start bit in the serial data. During the sleep mode of the DCD, the microcontroller 240 may not autobaud because it is in a non-operational, low power mode. The autobaud routine starts after the microcontroller 240 receives an interrupt signal and is operational.

Existing wake up methods are typically incapable of autobauding without first sending a separate wake up command, followed by sending the prefix AT. An apparatus and a method for both modem wake up and autobauding upon the receipt of AT are described below. The apparatus and the method are capable of autobauding at most terminal baud rates of the serial data.

FIG. 3 illustrates timing delays associated with autobauding. Values for baud time 300, $T_B$, range from 17.36 microseconds to 416.67 microseconds in most terminal-to-modem connections. After the SCC 230 determines that a start bit has occurred, there is an interrupt delay time 310 ($T_i$) before the interrupt signal is generated. $T_i$ 310 can be minimized by appropriate selection of SCC parameters, described below. When the microcontroller 240 is in the low power mode and receives the interrupt signal, a wake up time 320 ($T_w$) is required before the microcontroller 240 becomes operational. Once the microcontroller 240 is operational, a processing time 330 ($T_p$) is required for the microcontroller 240 to execute instructions to prepare for autobauding. The total delay time 340 ($T_a$), from the beginning of the start bit to the time at which the microcontroller 240 is restored and ready to begin an autobauding process, is the arithmetic sum of the individual time delays, i.e., $T_a=T_i+T_w+T_p$. In order for the microcontroller 240 to have enough time to wake up and autobaud to an incoming AT command at all the supported terminal baud rates, the interrupt delay time $T_i$ 310 is minimized and provisions are made for $T_a$ 340 in the autobaud routine. The value of $T_a$ 340 is partially determined from the manufacturer's specifications of the SCC 230 and microcontroller 240. In addition, $T_a$ 340 depends on the clock speed, the selected low power mode of the microcontroller 240, and the number of lines of code. As shown in FIG. 3, $T_a$ 340 is greater than $T_B$ 300 (shown at a high baud rate), while at low baud rates, $T_a$ may be less than $T_B$.

FIG. 4 is a flow diagram for the preferred embodiment of the invention, showing the steps which enable the modem 200 to wake up and autobaud to an AT command, which are also transparent to the terminal 110 and application. Before entering the sleep mode, in order to minimize $T_i$ 310, a preliminary configuring step 400 occurs in the SCC 230, which includes setting the UART baud rate to its maximum, setting the data bits parameter to its minimum, and enabling the break/abort interrupt. In the next step 410, appropriate interrupts are enabled or disabled in the microcontroller 240. Interrupts for incoming signals which may cause the controller to wake up are enabled, such as the interrupts for incoming ring, incoming transmit data (AT), and DTE status changes. Other interrupts for non-incoming signals are disabled, such as the interrupt for periodic timers. In setting up for the sleep mode in the preferred embodiment, the controller also initializes interrupt vectors, flags and other variables. The microcontroller 240 is then instructed to enter the low power mode, step 420. In the preferred embodiment, the I/O stop bit is set and a SLEEP instruction is executed. As a consequence, the modem 200 is then in the sleep mode.

Still referring to FIG. 4, when the modem 200 is in the sleep mode, the SCC 230 determines if a start bit has occurred in the serial data, step 430. If a start bit has occurred, then an interrupt signal is generated by the SCC 230, step 450, and the interrupt signal is sent to the microcontroller 240. The microcontroller 240 receives the interrupt signal and responds by transitioning or otherwise changing from the low power mode to an operational state, step 460, referred to as the controller operational state to distinguish it from the more general or overall DCD (or modem) operational state. Parameters of the SCC 230 and the microcontroller 240 are restored to values consistent with the operational mode of the modem 200, step 470, and may include restoring the operational values of the UART baud rate, the data bits parameter, disabling the break/abort interrupt, and otherwise undoing the instructions previously performed in steps 400 and 410. Finally, the autobaud routine is started, with the timing adjusted to compensate for the total delay time 340 ($T_a$), step 480.

In the preferred embodiment, the autobaud routine samples the least significant bit of the first character (e.g., the first "1" of the incoming "A") at pre-determined intervals to determine the speed of the incoming character. The capital "A" is the first letter of the "AT" and is represented by an 8 bit sequence (or, correspondingly, the lower case "a" of "at" is also represented by an 8 bit sequence). When waking up, it is necessary to enter the autobaud routine at a point in the code (or a time) which compensates for timing delays, loops, and instructions, and the time is essentially equal to the total delay time 340 ($T_a$). Our current research has indicated that typical autobaud routines can autobaud, without requiring other modifications, provided the total delay time $T_a$ 340 is less than 1.5 times the baud time ($T_B$) of the terminal baud rate.

Variations in the described method and apparatus are possible, including interrupting the microcontroller 240 directly with the start bit. That embodiment of the present invention may require, however, an additional dedicated interrupt pin at the microcontroller 240.

From the foregoing, it will be observed that numerous variations and modifications may be effected without departing from the spirit and scope of the novel concept of the invention. It is to be understood that no limitation with respect to the specific method illustrated herein is intended or should be inferred. It is, of course, intended to cover by the appended claims all such modifications as fall within the scope of the claims. The invention is further defined by the following claims.

We claim:

1. In an arrangement of a data communication device for coupling to a terminal, the terminal having a data line for sending serial data to the data communication device, the terminal further having a terminal baud rate and a terminal baud time $T_B$, the data communication device having a data communication device operational mode and further having a data communication device sleep mode, a wake up apparatus whereby the data communication device transitions from the data communication device sleep mode to the data communication device operational mode, the wake up apparatus comprising:

a serial communications controller coupled to the data line for monitoring the serial data, the serial communications controller having means for determining an occurrence of a start bit and further having means for generating an interrupt signal in response to the occurrence of the start bit within a first predetermined time period $T_i$; and a second controller coupled to the data line, the second controller having means for receiving the interrupt signal, the second controller further having means to transition from a low power mode to a second controller operational mode in response to the interrupt signal within a second predetermined time period $T_w$, and the second controller further having means to execute instructions to prepare for autobauding to a serial transmit data signal, within a third predetermined time period $T_p$, wherein an arithmetic sum of the first, second and third predetermined time periods ($T_i$, $T_w$ and $T_p$, respectively) is less than 1.5 times the terminal baud time $T_B$ of the terminal baud rate (($T_i+T_w+T_p$)< $(1.5)T_B$).

2. The wake up apparatus of claim 1, wherein the start bit is followed by a binary sequence for an AT command signal.

3. The wake up apparatus of claim 1, the second controller further having means to reactivate a data pump.

4. In an arrangement of a data communication device for coupling to a terminal, the terminal having a data line for sending serial data to the data communication device, the terminal further having a terminal baud rate and a terminal baud time $T_B$, the data communication device having a data communication device operational mode and further having a data communication device sleep mode, a wake up method whereby the data communication device transitions from the data communication device sleep mode to the data communication device operational mode, the wake up method comprising:

(a) determining an occurrence of a start bit in the serial data;

(b) generating an interrupt signal within a first predetermined time period ($T_i$) following said determination; and (c) transferring the data communication device from the data communication device sleep mode to the data communication device operational mode in response to the interrupt signal by transitioning a controller from a low power mode to a controller operational mode within a second predetermined time period ($T_w$) following said generation of the interrupt signal, and by executing instructions to prepare for autobauding to a serial transmit data signal within a third predetermined time period ($T_p$), wherein an arithmetic sum of the first, second and third predetermined time periods ($T_i$, $T_w$ and $T_p$, respectively) is less than 1.5 times the terminal baud time $T_B$ of the terminal baud rate (($T_i+T_w+T_p$)< $(1.5)T_B$).

5. The method of claim 4, wherein the start bit is followed by a binary sequence for an AT command signal.

6. The method of claim 4, further comprising:
starting an autobaud routine for determining the baud rate of the serial data.

7. The method of claim 4, further comprising:
reactivating a data pump.

8. In an arrangement of a data communication device for coupling to a terminal, the terminal having a data line for sending serial data to the data communication device, the terminal further having a terminal baud rate and a terminal baud time $T_B$, the data communication device having an operational mode and further having a sleep mode, a wake up method whereby the data communication device transitions from the sleep mode to the operational mode, the wake up method comprising:

(a) determining an occurrence of a start bit in the serial data;

(b) generating an interrupt signal within a first predetermined time period ($T_i$) following said determination;

(c) transitioning a controller from a low power mode to a controller operational mode within a second predetermined time period ($T_w$) following said generation of the interrupt signal;

(d) executing instructions to prepare for autobauding to a serial transmit data signal, within a third predetermined time period ($T_p$) following said transition;

(e) performing steps (b), (c) and (d) within a total time period less than 1.5 times the baud time $T_B$ of the terminal baud rate; and (f) reactivating a data pump.

9. In an arrangement of a data communication device for coupling to a terminal, the terminal having a data line for sending serial data to the data communication device, the terminal further having a terminal baud rate and a terminal baud time $T_B$, the data communication device having a data communication device operational mode and further having a data communication device sleep mode, a method of transitioning the data communication device from the data communication device operational mode to the data communication device sleep mode, the method comprising:

(a) configuring a serial communications controller for a predetermined response time;

(b) enabling second controller interrupts for incoming signals;

(c) disabling second controller interrupts for non-incoming signals; and (d) instructing the second controller to enter a low power mode, wherein a total delay time for a transition from the data communication device sleep mode to the data communication device operational mode is less than 1.5 times the terminal baud time $T_B$.

10. The method of claim 9 wherein step (b) further comprises enabling second controller interrupts for incoming ring, incoming transmit data, and DTE status changes.

11. The method of claim 9 wherein step (c) further comprises disabling second controller interrupt for periodic timers.

12. The method of claim 11 wherein step (a) further comprises:

(a1) setting a UART baud rate to its maximum;

(a2) setting a data bits parameter of the serial communications controller to its minimum; and (a3) enabling a break/abort interrupt of the serial communications controller.

13. The method of claim 12 wherein step (d) further comprises setting an input-output stop bit.

14. In an arrangement of a data communications device for coupling to a terminal, the terminal having a data line for sending serial data to the data communication device, the terminal further having a terminal baud rate and a terminal baud time $T_B$, the data communication device having a data communication device operational mode and further having a data communication device sleep mode, a wake up apparatus whereby the data communication device transitions from the data communication device sleep mode to the data communication device operational mode, the wake up apparatus comprising:

a serial communications controller having monitoring means for monitoring the serial data, the monitoring means having means for recognizing an occurrence of a start bit and further having means for generating an interrupt signal in response to the presence of the start bit within a first predetermined period of time $T_i$; and a second controller coupled to the data line, the second controller having means for receiving the interrupt signal, the second controller further having means for transferring from a low power mode to a second controller operational mode in response to the interrupt signal within a second predetermined time period $T_w$, and the second controller further having means to execute instructions to prepare for autobauding to a serial transmit data signal, within a third predetermined time period $T_p$, wherein an arithmetic sum of the first, second and third predetermined time periods ($T_i$, $T_w$ and $T_p$, respectively) is less than 1.5 times the terminal baud time $T_B$ of the terminal baud rate $(T_1+T_w+T_p) < (1.5)T_B$.

15. In an arrangement of a data communications device for coupling to a terminal, the terminal having a data line for sending serial data to the data communication device, the terminal further having a terminal baud rate and a terminal baud time $T_B$, the data communication device having a data communication device operational mode and further having a data communication device sleep mode, a wake up apparatus whereby the data communication device transitions from the data communication device sleep mode to the data communication device operational mode, the wake up apparatus comprising:

a serial communications controller having monitoring means for monitoring the serial data, the monitoring means having means for recognizing an occurrence of a start bit and further having means for generating an interrupt signal in response to the presence of the start bit; and a second controller coupled to the data line, the second controller having means for receiving the interrupt signal, the second controller further having means for transferring from a low power mode to a second controller operational mode in response to the interrupt signal, wherein a total delay time $T_a$ for a transition from the data communication device sleep mode to the data communication device operational mode is less than 1.5 times the terminal baud time $T_B$.

16. The wake up apparatus of claim 15, wherein the serial communications controller further has means to send the interrupt signal to the controller within a first predetermined time period $T_i$, and wherein the second controller further has means to transition from the low-power mode to the second controller operational mode within a second predetermined time period $T_w$ and to execute instructions to prepare for autobauding to a serial transmit data signal within a third predetermined time period $T_p$.

17. The wake up apparatus of claim 16, wherein the total delay time $T_a$ is an arithmetic sum of the first, second and third predetermined time periods $(T_a=(T_i+T_w+T_p))$ and is less than 1.5 times the terminal baud time $T_B$ of the terminal baud rate $(\{T_a=(T_i+T_w+T_p)\}<(1.5)T_B)$.

* * * * *